US 7,633,953 B2

(12) United States Patent
Haverinen et al.

(10) Patent No.: US 7,633,953 B2
(45) Date of Patent: Dec. 15, 2009

(54) METHOD, SYSTEM AND DEVICE FOR SERVICE SELECTION VIA A WIRELESS LOCAL AREA NETWORK

(75) Inventors: Henry Haverinen, Tampere (FI); Jouni Mikkonen, Tampere (FI)

(73) Assignee: Nokia Corporation, Espoo (FI)

( * ) Notice: Subject to any disclaimer, the term of this patent is extended or adjusted under 35 U.S.C. 154(b) by 1327 days.

(21) Appl. No.: 10/417,801

(22) Filed: Apr. 17, 2003

(65) Prior Publication Data

US 2004/0029580 A1   Feb. 12, 2004

(51) Int. Cl.
*H04L 12/28* (2006.01)
(52) U.S. Cl. ...................... 370/401; 370/338
(58) Field of Classification Search ........... None
See application file for complete search history.

(56) References Cited

U.S. PATENT DOCUMENTS

| 6,769,000 | B1 * | 7/2004 | Akhtar et al. | 707/103 R |
| 6,954,790 | B2 * | 10/2005 | Forslow | 709/227 |
| 2002/0116338 | A1 * | 8/2002 | Gonthier et al. | 705/52 |
| 2003/0033518 | A1 * | 2/2003 | Faccin et al. | 713/153 |
| 2003/0079144 | A1 * | 4/2003 | Kakemizu et al. | 713/200 |
| 2003/0163545 | A1 * | 8/2003 | Koskelainen et al. | 709/217 |
| 2004/0072557 | A1 * | 4/2004 | Paila et al. | 455/414.1 |

FOREIGN PATENT DOCUMENTS

WO   0176134   10/2001

OTHER PUBLICATIONS

RFC 2794, "*Mobile IP Network Access Identifier Extension for IPv4*," by P. Calhoun and C. Perkins, Mar. 2000.
"*Cisco Service Selection Gateway*," Cisco Systems Data Sheet, 1992-2001.
RFC 2284, "*PPP Extensible Authentication Protocol (EAP)*," by L. Blunk and J. Vollbrecht, Mar. 1998.
RFC 2486, "*The Network Access Identifier*," by B. Aboba and M. Beadles, Jan. 1999.
RFC 2868, "*RADIUS Attributes for Tunnel Protocol Support*," by G. Zorn et al., Jun. 2000.

* cited by examiner

*Primary Examiner*—Duc C Ho
(74) *Attorney, Agent, or Firm*—Ware, Fressola, Van Der Sluys & Adolphson LLP

(57) ABSTRACT

A method in a system, a system, a method in a terminal and a terminal for service selection in a data network. The method sends, from a Wireless Local Area Network (WLAN) terminal, a Network Access Identifier (NAI) including a service selection indicator via a WLAN access point; receives, at an authentication server, the NAI including a service selection indicator, and provides the WLAN terminal with a connection to the service indicated by said selection indicator. The system comprises at least one WLAN access point and terminal comprising means for including a service selection indicator in a NAI and means for sending said NAI including said service selection indicator via the WLAN access point, at least one authentication server comprising means for receiving said NAI, means for extracting said service selection indicator from said NAI and means for initiating connection to a service indicated by said service selection indicator.

28 Claims, 4 Drawing Sheets

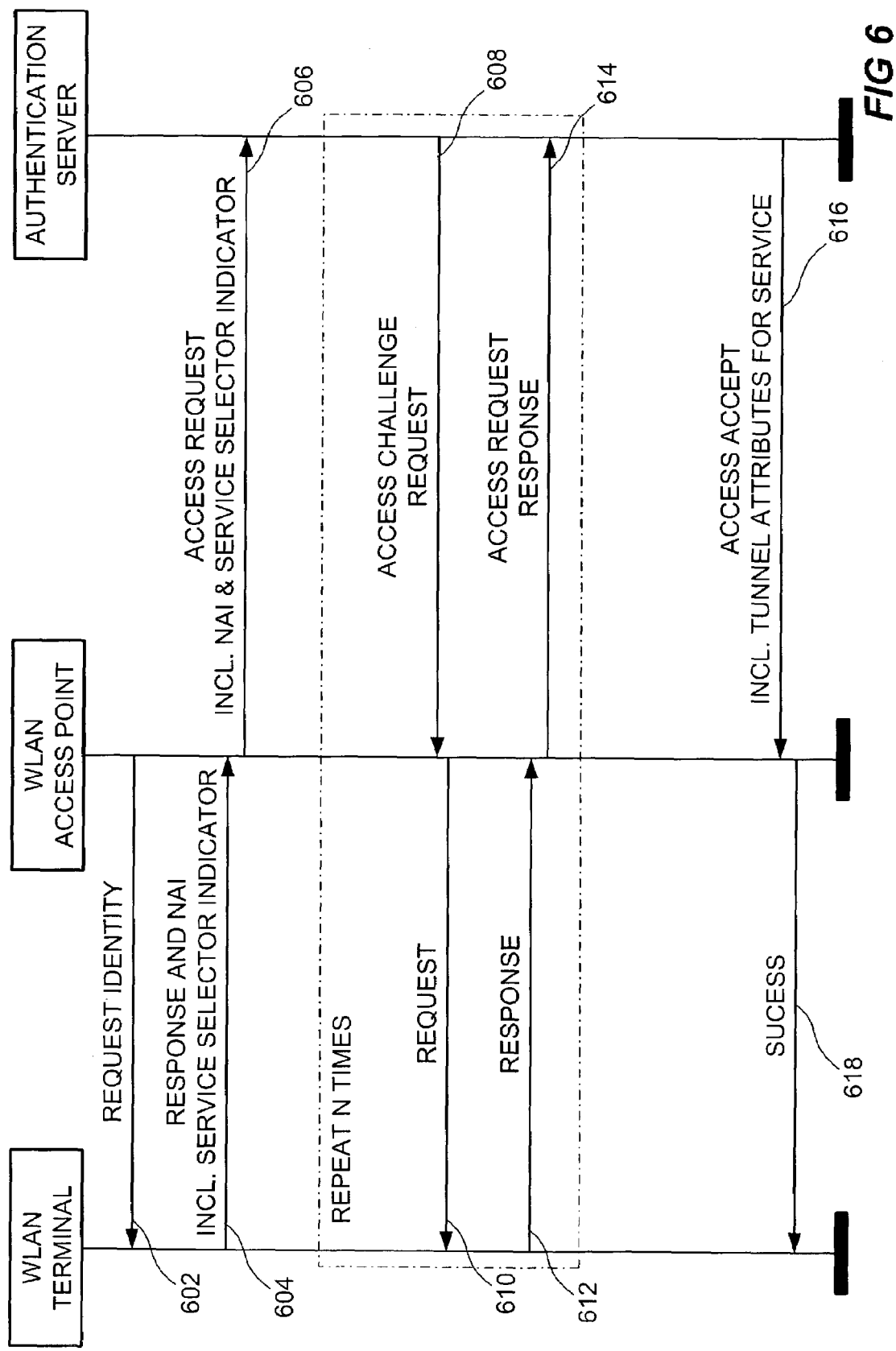

METHOD, SYSTEM AND DEVICE FOR SERVICE SELECTION VIA A WIRELESS LOCAL AREA NETWORK

CROSS-REFERENCE TO RELATED APPLICATIONS

This application claims priority under 35 USC §119 to International Patent Application No. PCT/IB02/01273 filed on Apr. 18, 2002.

TECHNICAL FIELD OF THE INVENTION

The invention relates to a method in a system and a system for service selection via a Wireless Local Area Network (WLAN). Further, the invention relates to a method in a terminal, a terminal, and a computer program.

BACKGROUND OF THE INVENTION

Today, communication and access to information or specific networks via various types of data networks is important. By introducing Wireless Local Area Networks (WLAN), communication and accessing information or networks has become easier and more flexible. One example of a WLAN is defined in the IEEE 802.11 standard. For example, a person that wants to get a connection via a network does not need to search for an unoccupied network socket and may freely choose the location where he want to be when connecting to the network, as long as the WLAN signals reaches this location.

However, when it comes to selecting different services, or views, the network system or a service provider decide the service accessible from a terminal connecting to the WLAN based on the identity of the terminal. In the context of this application a service is a network environment that the WLAN terminal is or will be connected to, for example the service may be a local network, a private network, the Internet, a specific service provider provided network, virtual local area networks, etc. Thus, a WLAN terminal that is connecting to a network is restricted to a service predetermined by the network system or the service provider, even if the WLAN is able to provide connections to different services.

SUMMARY OF THE INVENTION

It is an object of the present invention to provide an improved WLAN system facilitating selection of various services.

More particularly, according to one aspect, a method for service selection in a data network comprising at least one Wireless Local Area Network (WLAN) access point, comprises:

sending, from a WLAN terminal, a network access identifier (NAI) including a service selection indicator via the WLAN access point, receiving, at an authentication server, the network access identifier including a service selection indicator, and providing the WLAN terminal with a connection to the service that is indicated by said selection indicator.

According to another aspect, a system for selecting services in a network comprises:

at least one Wireless Local Area Network (WLAN) access point, at least one WLAN terminal comprising means for including a service selection indicator in a Network Access Identifier (NAI) and means for sending said NAI including said service selection indicator via the WLAN access point, and at least one authentication server comprising means for receiving a NAI including said service selection indicator, means for extracting said service selection indicator from said NAI and means for initiating a connection to a service indicated by said service selection indicator.

According to a further aspect, a method in a terminal for selecting services comprises:

setting a service selection indicator, including said service selection indicator in a Network Access Identifier (NAI), sending said NAI including said service selection indicator over a Wireless Local Area Network (WLAN), and receiving at least one message for establishing a connection to the indicated service.

According to yet a further aspect, a terminal that is enabled for communication via a Wireless Local Area Network (WLAN) comprises:

means for setting a service selection indicator, means for including said service selection indicator in a Network Access Identifier (NAI), means for sending said NAI including said service selection indicator, and means for establishing a connection to an indicated service in response to at least one message for establishing a connection.

According to yet another aspect, an authentication server comprises means for receiving a Network Access Identifier (NAI) including a service selection indicator, means for extracting said service selection indicator from said NAI, and means for initiating a connection between a WLAN terminal and a service indicated by said service selection indicator.

According to a further aspect, a method in an authentication server comprises receiving a Network Access Identifier (NAI) including a service selection indicator, extracting said service selection indicator from said NAI, and initiating a connection between a WLAN terminal and a service indicated by said service selection indicator.

In the context of the invention the NAI is an identifier comprising the identity identifying the WLAN terminal and/or an identity identifying the user. Further the NAI comprises an identity identifying an authentication server that is to be used for establishing a connection.

By including said service selection indicator in a NAI it becomes possible to select a service from the WLAN terminal. Thus, the user becomes free to make a selection of service, if the user or WLAN terminal is entitled to do so. Further, a NAI is used with common WLAN protocols in order to enable roaming and by including the selection indicator in the NAI the selection indicator may be sent via the WLAN using existing protocols for such communication. Thus, the service providers are able to provide service selection capability in existing or future WLAN systems without too much extra effort.

In one embodiment the NAI is of the form <user>@<realm>. In such a NAI the service selection indicator may be included in the <realm> portion of the NAI.

In another embodiment an Authentication Authorization Accounting (AAA) protocol is used for the communication to the WLAN terminal. The use of an AAA protocol in combination with the service selection indicator may facilitate provision of billable services; thus, possibly making service providers more eager to provide a plurality of services resulting in a greater freedom for users to select services.

In yet another embodiment tunnel attributes relating to an indicated service may be provided to the WLAN terminal. This makes it possible provide the user with any type of service that can be tunneled.

In a further embodiment Virtual Local Area Network (VLAN) attributes relating to an indicated service may be provided to the WLAN terminal. This makes it possible to connect the user to a user selected VLAN.

In one embodiment the user identity, the service selection indicator, and a billable feature is logged in facilitate administration of billing of services utilized by the user having said user identity.

A further scope of applicability of the present invention will become apparent from the detailed description given below. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

Other features and advantages of the present invention will become apparent from the following detailed description of a presently preferred embodiment, with reference to the accompanying drawings, in which FIG. 6 is a timing diagram of one embodiment of the system in FIG. 1.

DETAILED DESCRIPTION OF AN EMBODIMENT

Figure 1:
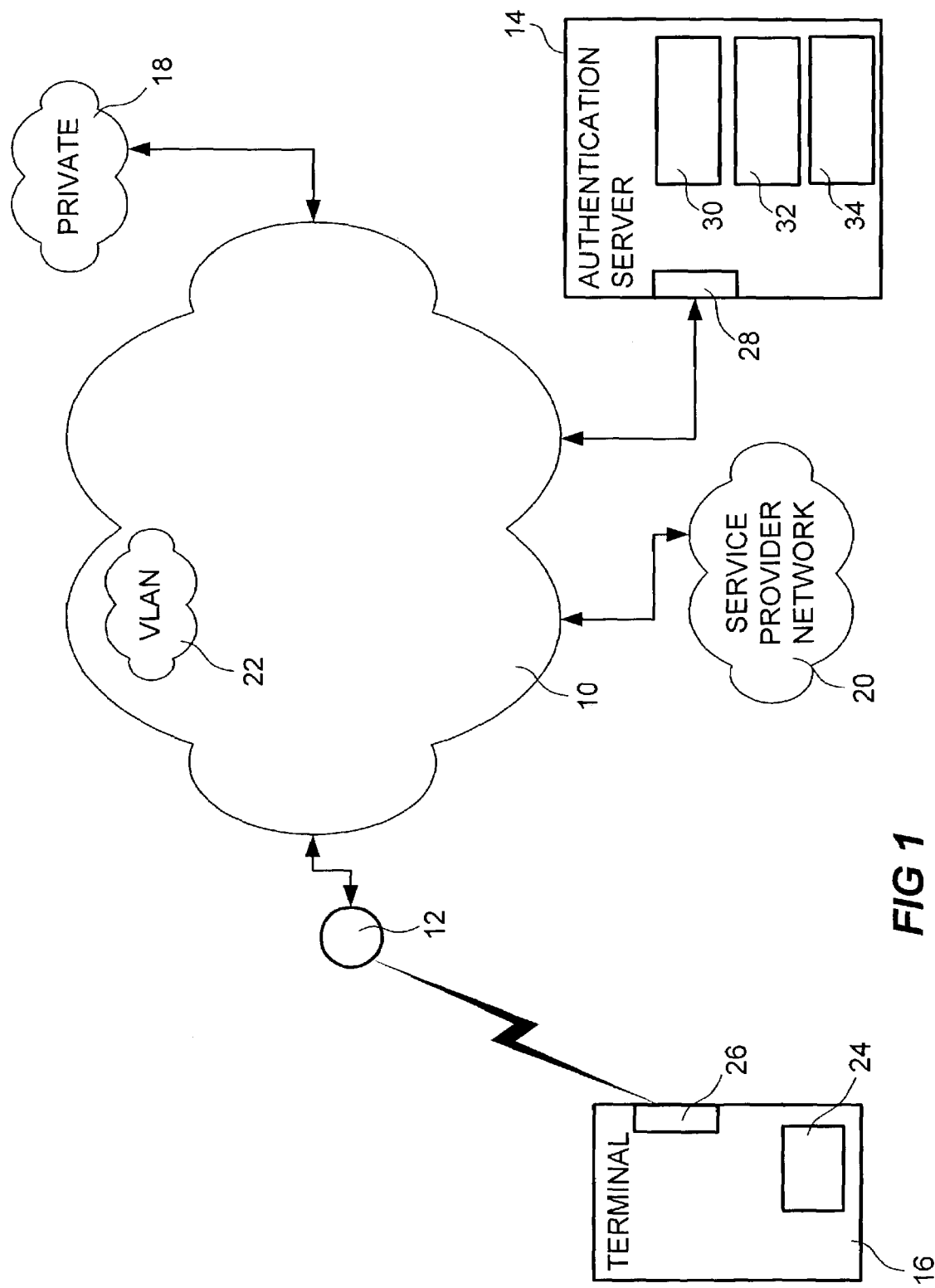
FIG. 1 is a schematic overview of one embodiment of an improved system, an improved WLAN terminal and an improved authentication server.

In FIG. 1 a schematic overview of a network system in which the invention may be used is shown. The system comprises a data network 10, a Wireless Local Area Network (WLAN) access point 12, an authentication server 14 and a WLAN terminal 16. The network 10 may be a Local Area Network (LAN), a Wide Area Network (WAN), the Internet, a wireless network, a wired network, etc. The WLAN access point 12 enables network communication from the WLAN terminal 16, which is arranged to communicate using WLAN protocols. The WLAN terminal 16 may be any WLAN enabled terminal, for example, a laptop, a personal digital assistant (PDA), cellular telephone, etc. The WLAN may be any type of WLAN that enables the WLAN terminal 16 to provide its identity and/or the identity of the user to the network 10 and that enables the WLAN terminal 16 to provide the identity of an authentication server 14 that is to be used to access the network 10. For example, a WLAN according to IEEE 802 standard, WPAN, Bluetooth, Home RF, or HIPERLAN. In the context of the invention an identifier providing the above-mentioned identities is called a Network Access Identifier (NAI).

The authentication server 14 is a system for authorizing access to a service and is provided by a service provider. The authentication server 14 includes a network connection means 28, means 30 for authenticating a WLAN terminal, means 32 for extracting a service selection indicator from a received NAI, and means 34 for providing connection attributes corresponding to a selected service. In one embodiment the authentication server 14 may be an Authentication Authorization Accounting Server.

A service provider is a company, an organization or a department that provides access to one or a plurality of network environments, for example, a local network 10, a private network 18, the Internet 10, a specific network 20 provided by the service provider, virtual local area networks (VLAN) 22, etc.

The WLAN terminal 16 comprises means 24 for adding a service selection indicator to a NAI and a WLAN transceiving means 26 for sending data packets to and receiving data packets from a WLAN access point 12.

Figure 2:
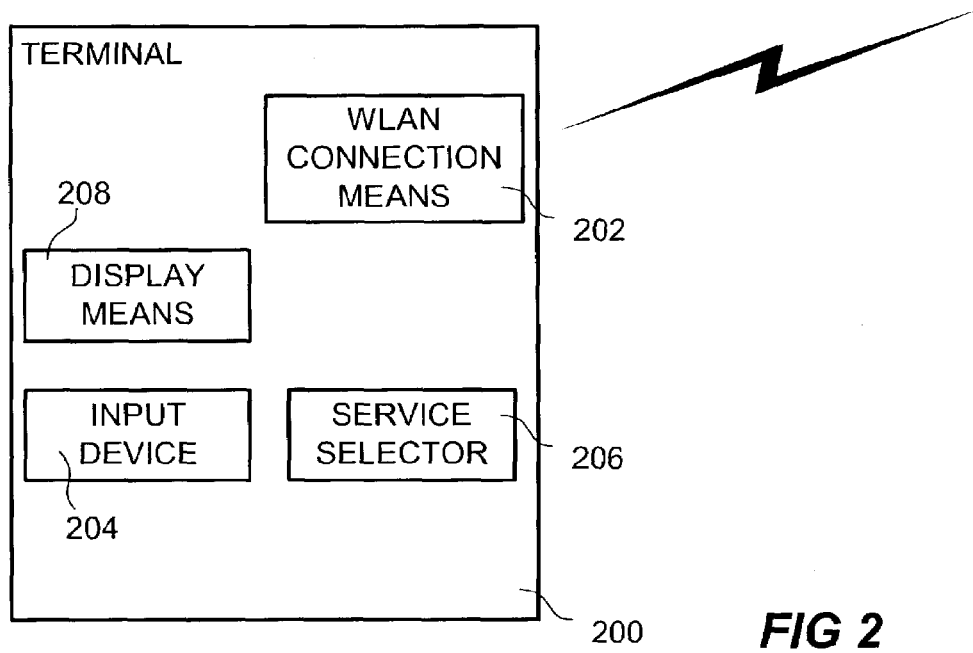
FIG. 2 is a schematic block diagram of one embodiment of the WLAN terminal in FIG. 1.

In FIG. 2 there is shown a schematic view of an embodiment of a WLAN terminal 200. The WLAN terminal comprises WLAN transceiving means 202. The transceiving means 202 comprises a protocol stack including protocols for handling the communication, the stack may include parallel protocols for communications according to different communication standards or communication methods. At least one protocol at the data link layer, according to the Open System Interconnection (OSI) reference model, ISO 7498, is arranged to include a NAI in a data packet for transmission to the WLAN access point.

According to one embodiment, the WLAN terminal comprises input means 204 and service selector means 206. The service selector means 206 is arranged to receive an input from the input means 204 and include a service selection indicator in the NAI. The input received from the input means 204 may, for example, be the complete service selection indicator that is to be included in the NAI or it may be a reference to a service selection indicator stored in the WLAN terminal 200. In the latter case the service selector means 206 retrieves the complete service selection indicator and includes it in the NAI. The input means 204 may, for example, be a keyboard, a scanner, a pressure sensitive surface, a microphone combined with voice recognition, a pointing device etc.

In one embodiment the WLAN terminal 200 comprises display means 208. In such embodiment the service selector means 206 may be arranged to present a list of services to select from.

In an embodiment in which the WLAN operates according to IEEE 802, the NAI may look like <username>@<realm>. The <username> is the identity of the user and/or the WLAN terminal and the <realm> is the identity of the authentication server that is to handle the service request from the terminal. Such a NAI may, for example, look like name@serviceprovider.com. The service selection indicator may be inserted anywhere in the NAI. In one embodiment the service selection indicator is inserted between the "@" and the <realm>, i.e. <username>@<service selection indicator><realm>, but the service selection indicator may be inserted anywhere in the NAI.

Figure 3:
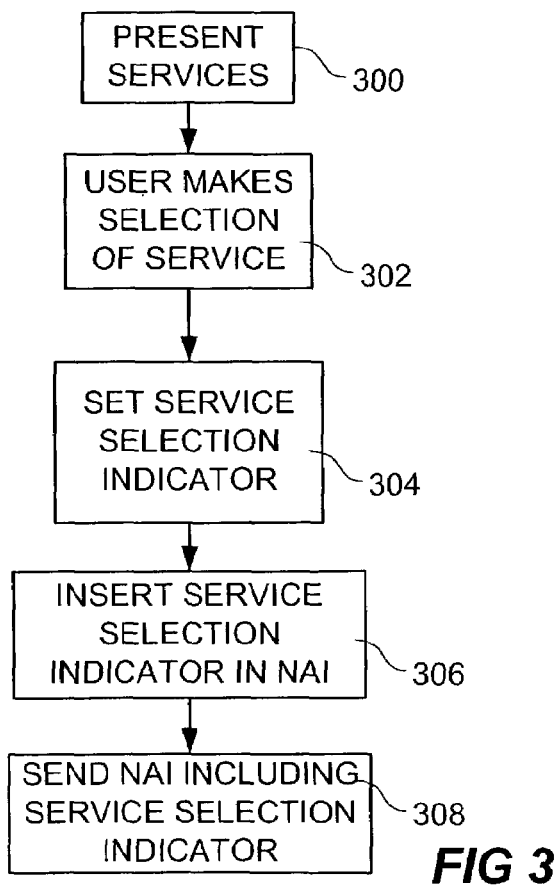
FIG. 3 is a flowchart of a service selection process in one embodiment of the WLAN terminal in FIG. 1.

In FIG. 3 there is shown a flowchart of the service selection process in one embodiment of a WLAN terminal. The WLAN terminal starts with presenting a list of services on the display device, step 300. Then a user of the WLAN terminal is able to make a selection from said list of services, step 302. The user may do the selection by inputting a reference number referring to the desired service in the list, by pointing and clicking at the desired service, by speaking a reference to a selection into a microphone, etc. From the selection made by the user a reference to the selected service is generated and by means of this reference the WLAN terminal retrieves and sets a service selection indicator, step 304. Then the WLAN terminal inserts the service selection indicator into the NAI, step 306. When the service selection indicator is inserted in the NAI the WLAN terminal sends the service request, included in the NAI, over the WLAN, step 308.

Figure 4:
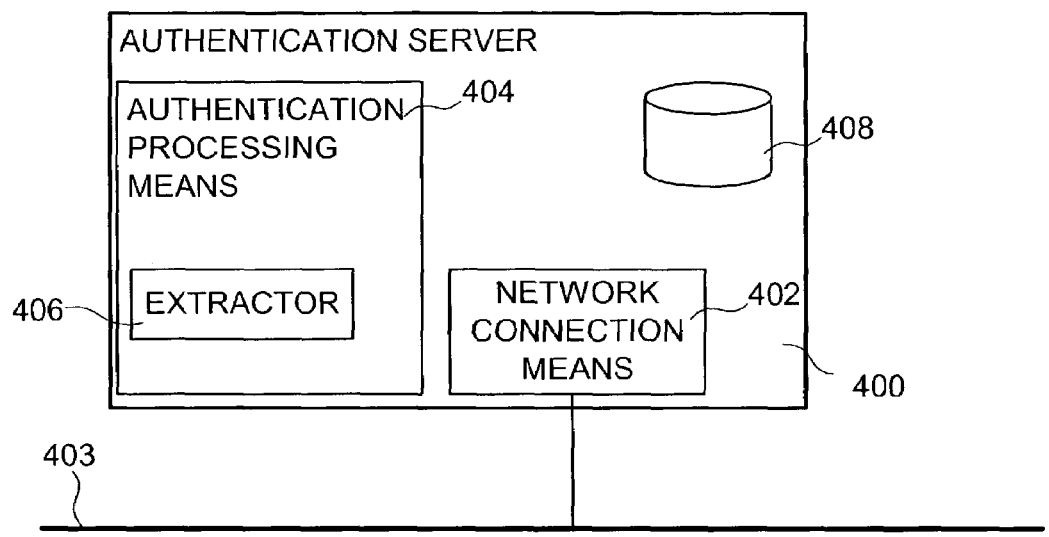
FIG. 4 is a schematic block diagram of one embodiment of the authentication server in FIG. 1.
Figure 5:
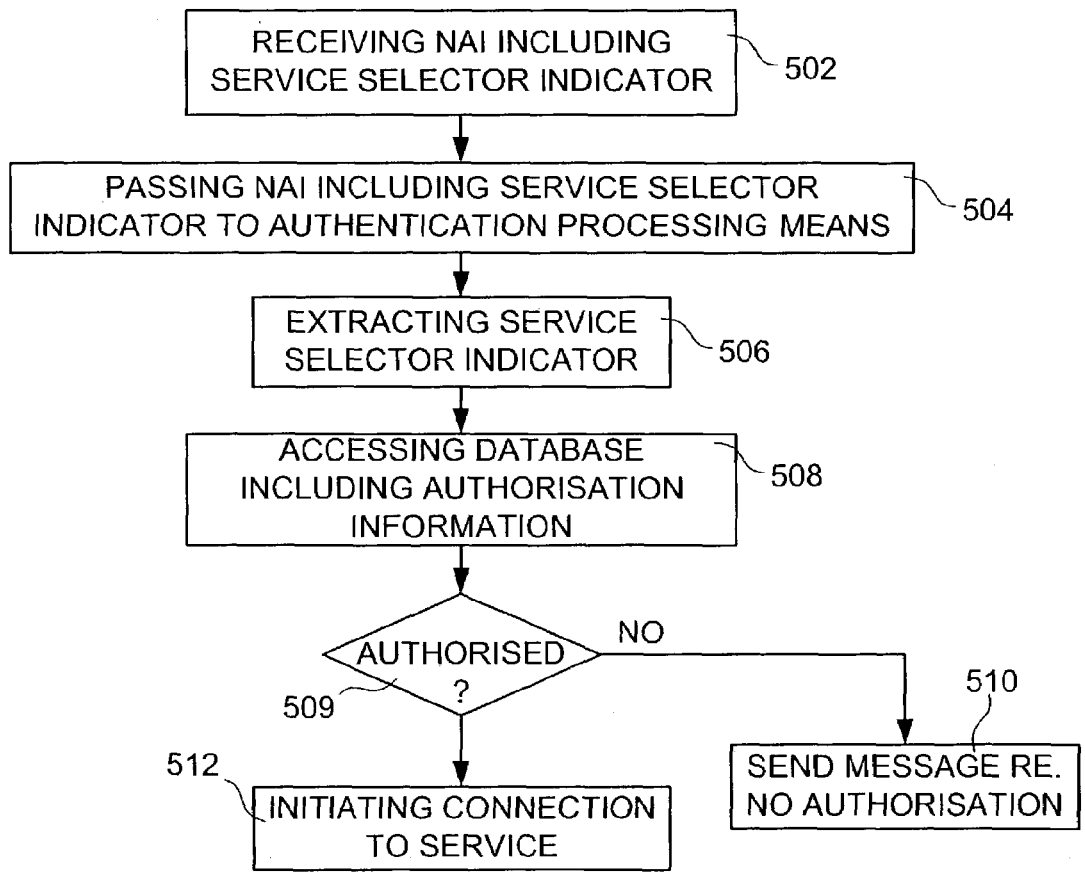
FIG. 5 is a flowchart of a service selection process in one embodiment of the authentication server in FIG. 1.

In FIG. 4 one embodiment of the authentication server 400 is schematically shown and in FIG. 5 a flowchart over the service selection process in one embodiment of the authentication server 400 is shown. The authentication server 400 includes a network connection means 402 for communication over the network 403 that it is connected to. The network 403 may, for example, be a Local Area Network (LAN), a Wide Area Network (WAN), the Internet, a wireless network, a wired network, etc. Via the network connection 402 the authentication server 400 receives a data packet carrying a NAI including a service selection indicator, step 502. The NAI is passed to an authentication processing means 404, step 504. The authentication processing means 404 comprises means 406 for extracting a service selection indicator from a NAI. The means 406 for extracting a service selection indicator extracts the service indicator from the NAI, step 506. Then the authentication processing means 404 access a database 408 including information regarding who or which devices and/or users that are authorized to connect to specific services, step 508. The database 408 may be provided within the authentication server or as one or a plurality of external databases connected directly to the authentication server or via the network connection. Thus, the authentication server 404 utilizes the identity included in the NAI and the service selection indicator to determine whether the sender of the NAI is authorized to connect to the service that the service selection indicator points out or not, step 509. If the sender is not authorized to connect to the service, then a message indicating that the authorization for the requested service has failed is sent to the requesting WLAN terminal, step 510. However, if the sender is authorized to connect to the service, then the authentication server initiate the connection of the WLAN terminal to the service, step 512, for example, by sending to the WLAN terminal the attributes necessary for setting up the connection.

In FIG. 6 there is shown an example timing diagram of one embodiment. In the timing diagram the Extensible Authentication Protocol (EAP) and the access control protocol called "Remote Authentication Dial-In User Service" (RADIUS) is used, however, any protocol resulting in corresponding functionality may be used, e.g. Diameter, which is a protocol developed from the RADIUS protocol, or any future Authentication Authorization Accounting protocol (AAA-protocol). The WLAN access point starts with requesting the identity of the user/WLAN terminal. For this purpose the access point sends an EAP-Request/Identity packet, 602, to the WLAN terminal. The WLAN terminal responds with an EAP-Response/Identity packet 604, which includes the NAI including the service selector indicator. The WLAN access point then sends a RADIUS Access-Request packet 606, which includes the NAI including the service selector indicator, to the authentication server. When the authentication server has received the RADIUS Access-Request packet 606 it checks whether the terminal and/or the user is authorized to connect to the requested service or not. If the user/terminal is not authorized, then the authentication server refuses the connection attempt.

However if the user/terminal is authorized, then the authentication server sends a RADIUS Access-Challenge packet 608, including an EAP-request, to the WLAN Access point. When the RADIUS Challenge-Challenge packet 608 is received at the WLAN Access point, the WLAN Access point sends an EAP-request packet 610, including the above mentioned EAP-request, to the WLAN terminal. The WLAN terminal responds to this packet 610 by sending an EAP-response packet 612 to the WLAN access point, which then sends a RADIUS Access-Request packet 614, including the EAP-response, to the authentication server. The procedure of sending packets 608, 610, 612, and 614 may be repeated N number of times. The value of N varies depending on the authentication method used.

The authentication is completed either as a failure, if the WLAN terminal and/or user failed the authentication process, or as a success, if the WLAN terminal was successfully authenticated. If the authentication is a failure the authentication server sends a failure packet to the WLAN terminal via the WLAN access point. However, if the authentication is a success the authentication server retrieves the network attributes needed for providing a connection in accordance with the service that was requested by means of the service selector indicator. For example, the network attributes may be tunnel attributes for a Virtual LAN identifier, which directs the data packets of the WLAN terminal to a specific Virtual LAN. Then the authentication server sends a RADIUS Access-Accept packet 616, including the network attributes for the requested service, to the WLAN access point. The WLAN access point then provides the WLAN terminal with an EAP-Success packet 618, and now the WLAN terminal has access to the requested service.

By making services selectable for a user and by utilizing an AAA-protocol, e.g. RADIUS, a service provider may easily create, provide and log billable services and a user may get access to an increasing number of services. For example, it is possible to generate a log of every user and the services the user has utilized. An indicator of the selected service and the identity of the user is sent to the access server by means of the NAI and is thus easily registered in the log. Further, the identity of the user/terminal may be confirmed by means of an authentication process, such process may utilize a signaling scheme generating packets corresponding to the packets 608, 610, 612, 614 in FIG. 6. Additional, a billable feature is measured and registered in the log, such billable feature may be a time interval during which the service has been used, an amount of data transferred to, from or both to and from the WLAN terminal, the number of times the service has been used, etc. The log may then be used by the service provider for billing the user.

In one embodiment the functionality of the WLAN terminal and the authentication server may be implemented by means of software code that are arranged to be run in the WLAN terminal and the authentication server, respectively.

The invention claimed is:

1. A method comprising:
sending, from a wireless local area network terminal, a network access identifier including a service selection indicator via a wireless local area network access point of a data network,
receiving, at an authentication server, the network access identifier including the service selection indicator, and
providing the wireless local area network terminal with a connection to a service that is indicated by the service selection indicator, wherein the network access identifier is of the form <user>@<realm> and the service selection indicator is included in the <realm> portion of the network access identifier.

2. The method according to claim 1, wherein communication to and from said wireless local area network terminal utilizes an authentication authorization accounting protocol.

3. The method according to claim 1, wherein said providing the wireless local area network terminal with a connection includes transferring tunnel attributes to said wireless local area network terminal.

4. The method according to claim 1, wherein said providing the wireless local area network terminal with a connection includes transferring virtual local area network attributes to wireless local area network terminal.

5. A system for selecting services in a network, the system comprising:
   at least one wireless local area network access point,
   at least one wireless local area network terminal configured to include a service selection indicator in a network access identifier and to send said network access identifier including said service selection indicator via the wireless local area network access point, and
   at least one authentication server configured to receive a network access identifier including said service selection indicator, to extract said service selection indicator from said network access identifier and to initiate a connection to a service indicated by said service selection indicator, wherein the network access identifier is of the form <user>@<realm> and the service selection indicator is included in the <realm> portion of the network access identifier.

6. The system according to claim 5, wherein the at least one authentication server configured to initiate a connection is configured to send tunnel attributes relating to said connection.

7. The system according to claim 5, wherein the at least one authentication server configured to initiate a connection is configured to send virtual local area network attributes relating to said connection.

8. A method in a terminal for selecting services, said method comprising:
   setting a service selection indicator,
   including said service selection indicator in a network access identifier,
   sending said network access identifier including said service selection indicator over a wireless local area network, and
   receiving at least one message for establishing a connection to an indicated service, wherein the network access identifier is of the form <user>@<realm> and the service selection indicator is included in the <realm> portion of the network access identifier.

9. The method according to claim 8, further comprising receiving an input from the user indicating a selected service.

10. The method according to claim 9, further comprising presenting selectable services for a user.

11. The method according to claim 8, wherein said receiving at least one message establishing a connection further comprises receiving tunnel attributes for use in establishing the connection.

12. The method according to claim 8, wherein said receiving at least one message establishing a connection further comprises receiving virtual local area network attributes for use in establishing the connection.

13. An internal memory of a terminal storing software code portions for performing the method of claim 8 when said software code portions are executed by a processor.

14. A terminal that is enabled for communication via a wireless local area network, said terminal comprising:
   a service selector for setting a service selection indicator and for including said service selection indicator in a network access identifier, and
   a wireless local area network module for sending said network access identifier including said service selection indicator and for establishing a connection to an indicated service in response to at least one message for establishing a connection, wherein the network access identifier is of the form <user>@<realm> and the service selection indicator is included in the <realm> portion of the network access identifier.

15. The terminal according to claim 14, further comprising an input device for input of an indicator of a selected service.

16. The terminal according to claim 15, further comprising a display for presenting selectable services for a user.

17. The terminal according to claim 14, wherein said wireless local area connection module for establishing a connection is configured to establish a connection based on received tunnel attributes.

18. The terminal according to claim 14, wherein said wireless local area connection module for establishing a connection is configured to establish a connection based on received virtual local area network attributes.

19. An authentication server comprising:
   a network connection module for receiving a network access identifier including a service selection indicator,
   an extractor for extracting said service selection indicator from said network access identifier, and
   an authentication processor for initiating a connection between a wireless local area network terminal and a service indicated by said service selection indicator, wherein the network access identifier is of the form <user>@<realm> and the service selection indicator is included in the <realm> portion of the network access identifier.

20. The authentication server according to claim 19, wherein the authentication processor is further configured to retrieve attributes for setting up a connection to the service indicated by said service selection indicator.

21. The authentication server according to claim 19, wherein the authentication server is an authentication authorization accounting server.

22. The authentication server according to claim 21, further comprising a log including at least one record, which includes a user identity, a service selection indicator, and a value representing a billable feature.

23. A method in an authentication server comprising:
   receiving a network access identifier including a service selection indicator,
   extracting said service selection indicator from said network access identifier, and
   initiating a connection between a wireless local area network terminal and a service indicated by said service selection indicator, wherein the network access identifier is of the form <user>@<realm> and the service selection indicator is included in the <realm> portion of the network access identifier.

24. The method according to claim 23, wherein said initiating a connection comprises sending connection attributes related to the service that is indicated by said service selection indicator.

25. The method according to claim 23, further comprising controlling if a user identified in the network access identifier is authorized to access the service indicated in the network access identifier.

26. The method according to claim 23, further comprising logging a billable feature for an identified user utilizing an indicated service.

27. A terminal that is enabled for communication via a wireless local area network, said terminal comprising:
- means for setting a service selection indicator,
- means for including said service selection indicator in a network access identifier,
- means for sending said network access identifier including said service selection indicator, and
- means for establishing a connection to an indicated service in response to at least one message for establishing a connection, wherein the network access identifier is of the form <user>@<realm> and the service selection indicator is included in the <realm> portion of the network access identifier.

28. An authentication server comprising:
- means for receiving a network access identifier including a service selection indicator,
- means for extracting said service selection indicator from said network access identifier, and
- means for initiating a connection between a wireless local area network terminal and a service indicated by said service selection indicator, wherein the network access identifier is of the form <user>@<realm> and the service selection indicator is included in the <realm> portion of the network access identifier.

* * * * *

UNITED STATES PATENT AND TRADEMARK OFFICE
CERTIFICATE OF CORRECTION

| | |
|---|---|
| PATENT NO. | : 7,633,953 B2 |
| APPLICATION NO. | : 10/417801 |
| DATED | : December 15, 2009 |
| INVENTOR(S) | : Henry Haverinen et al. |

It is certified that error appears in the above-identified patent and that said Letters Patent is hereby corrected as shown below:

In column 7, line 10, which is claim 4, line 3, "to" should be --to said--.

Signed and Sealed this

Thirtieth Day of March, 2010

David J. Kappos
*Director of the United States Patent and Trademark Office*

UNITED STATES PATENT AND TRADEMARK OFFICE
CERTIFICATE OF CORRECTION

PATENT NO. : 7,633,953 B2  Page 1 of 1
APPLICATION NO. : 10/417801
DATED : December 15, 2009
INVENTOR(S) : Haverinen et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1996 days.

Signed and Sealed this

Twenty-first Day of December, 2010

David J. Kappos
*Director of the United States Patent and Trademark Office*